United States Patent [19]

Itoh et al.

[11] Patent Number: 5,916,957
[45] Date of Patent: Jun. 29, 1999

[54] RUBBER COMPOSITIONS FOR TIRE TREAD

[75] Inventors: Kuniko Itoh, Kodaira; Hideaki Yokoyama, Toda, both of Japan

[73] Assignee: Bridgestone Corporation, Tokyo, Japan

[21] Appl. No.: 08/839,348

[22] Filed: Apr. 18, 1997

Related U.S. Application Data

[63] Continuation of application No. 08/549,219, Oct. 27, 1995, abandoned.

[30] Foreign Application Priority Data

Oct. 28, 1994 [JP] Japan ................................ 6-265365
Sep. 20, 1995 [JP] Japan ................................ 7-241753

[51] Int. Cl.$^6$ .................................................. B60C 1/00
[52] U.S. Cl. .................. 524/496; 525/332.3; 525/332.9; 525/359.1
[58] Field of Search ............................. 525/359.1, 332.9, 525/332.3; 524/496

[56] References Cited

U.S. PATENT DOCUMENTS

| | | | |
|---|---|---|---|
| 5,173,550 | 12/1992 | Hsu et al. ............................. | 526/180 |
| 5,187,223 | 2/1993 | Asatsuma .............................. | 524/496 |
| 5,272,220 | 12/1993 | Rogers ................................. | 525/332.3 |
| 5,317,062 | 5/1994 | Rogers ................................. | 525/237 |
| 5,422,403 | 6/1995 | Hsu ..................................... | 525/342 |
| 5,552,940 | 9/1996 | Zanzig et al. ......................... | 525/237 |

FOREIGN PATENT DOCUMENTS 2 160 207  12/1985  United Kingdom .

OTHER PUBLICATIONS

Chemical Abstracts, vol. 101, No. 20, Nov. 12, 1984, abstract No. 172852 JP-A-59 096 143.

*Primary Examiner*—Jeffrey C. Mullis
*Attorney, Agent, or Firm*—Sughrue, Mion, Zinn, Macpeak & Seas, PLLC

[57] ABSTRACT

A rubber composition for tire tread has a considerably improved rolling resistance without degrading wet-skid resistance, fracture resistance and wear resistance and comprises a particular styrene-isoprene copolymer as a rubber ingredient, in which a part or whole of the copolymer is a terminal-modified copolymer coupled at its active terminal with a particular halogenated tin compound.

5 Claims, No Drawings

RUBBER COMPOSITIONS FOR TIRE TREAD

This is a continuation of application Ser. No. 08/549,219 filed Oct. 27, 1995 now abandoned.

BACKGROUND OF THE INVENTION

1. Field of the Invention

This invention relates to a rubber composition for a tire tread, and more particularly to a rubber composition suitable for use in a tread of a pneumatic tire considerably reducing rolling resistance without degrading wet-skid resistance, fracture resistance and wear resistance.

2. Description of the Related Art

Recently, it becomes important to study the reduction of the rolling resistance in the tire for saving the fuel consumption in the automobile in accordance with social demands of resource-saving and energy-saving. In general, it is known that the fuel consumption of the automobile is mitigated by reducing the rolling resistance of the tire or by so-called low fuel consumption tire. In order to reduce the rolling resistance, it is common to use a rubber material having a small hysteresis loss as a tread rubber of the tire. On the other hand, it is strongly demanded to use a rubber material having a high frictional resistance on wet road surface (wet skid resistance) from a viewpoint of the demand on the running stability.

However, the low rolling resistance and the high frictional resistance on wet road surface are conflicting with each other, so that it is very difficult to simultaneously satisfy these properties.

Lately, the rolling resistance and wet skid resistance of the tire are theoretically related to viscoelastic properties of the rubber composition. In this case, it is effective to decrease the hysteresis loss of the tread rubber for reducing the rolling resistance during the running of the tire, or viscoelastically decrease the loss tangent (tan $\delta$) at a temperature of 50–70° C. corresponding to the running tire temperature in order to obtain a low fuel consumption. On the other hand, it is known that the wet skid resistance is well interrelated to the loss tangent at about 0° C. under a frequency of 10–20 Hz, so that it is necessary to increase the loss tangent at about 0° C. in order to improve the gripping property of the tire.

As a method of decreasing the hysteresis loss or tan $\delta$ at a temperature of 50–70° C., it is general to use a rubber material having a low glass transition temperature (Tg) such as high-cis polybutadiene rubber or a rubber material having a high rebound resilience such as natural rubber.

However, the wet skid resistance is extremely lowered in these rubber materials, so that it is considerably difficult to simultaneously establish the running stability and the low rolling resistance according to the conventional techniques.

SUMMARY OF THE INVENTION

It is, therefore, an object of the invention to solve the above problems and to provide a rubber composition suitable for use in a tread of a pneumatic tire considerably reducing rolling resistance without degrading wet-skid resistance, fracture resistance and wear resistance.

According to the invention, there is the provision of a rubber composition for a tire tread containing as a rubber ingredient 30–100% by weight of anion-polymerized styrene-isoprene copolymer having a bound styrene content of 5–25% and a content of 1,2- and 3,4-bonds in bound isoprene portion of 5–35%, an improvement wherein 30–100% by weight of the copolymer is a terminal-modified copolymer, whose active terminal is subjected to a coupling treatment with a halogenated tin compound represented by a general formula of $SnR_pX_q$ wherein R is a substituent selected from the group consisting of an alkyl group, an alkenyl group, a cycloalkyl group and an aryl group, X is a halogen atom, p is an integer of 0–3 and q is an integer of 1–4 provided that p+q=4.

In a preferable embodiment of the invention, the styrene-isoprene copolymer before the coupling treatment contains a butadiene bond at its terminal.

In another preferable embodiment of the invention, the rubber composition contains carbon black having a concentration of >C=O functional group of not less than 0.040 meq/g as measured by oxime formation method and a concentration of —OH functional group of not less than 0.15 meq/g as measured by neutralization method with NaOH.

DESCRIPTION OF THE PREFERRED EMBODIMENTS

The styrene-isoprene copolymer according to the invention is an anion-polymerized styrene-isoprene copolymer having a bound styrene content of 5–25% and a content of 1,2- and 3,4-bonds in bound isoprene portion of 5–35%. When the bound styrene content is less than 5%, the strength at fracture is poor and tan $\delta$ (0° C.) is low to degrade the wet skid resistance, while when it exceeds 25%, the hysteresis loss is large and the rolling resistance is poor. Similarly, when the content of 1,2- and 3,4-bonds in the bound isoprene portion is less than 5%, tan $\delta$ (0° C.) is low and the wet skid resistance is poor, while when it exceeds 35%, the hysteresis loss is large and the rolling resistance is poor.

Furthermore, this copolymer is required to be used in an amount of 30–100% by weight as a rubber ingredient. When the amount of the copolymer used is less than 30% by weight, the low rolling resistance and the wet-skid resistance can not simultaneously be established.

The styrene-isoprene copolymer according to the invention is produced by anion polymerization of isoprene monomer and styrene monomer.

As an initiator for the anion polymerization, it is favorable to use lithium type initiators, which include, for example, methyllithium, ethyllithium, propyllithium, n-butyllithium, sec-butyllithium, tert-butyllithium, hexyllithium, octyllithium, phenyllithium, cyclohexyllithium, 1,4-dilithiobutane and the like. Among them, n-butyllithium and sec-butyllithium are preferable.

These lithium type initiators may be used alone or in admixture. Moreover, the amount of the lithium initiator used is within a range of 0.2–20 mmol per 100 g of the monomer.

In general, the polymerization is carried out at a temperature of −20° C. to 150° C., preferably 20–120° C. Moreover, the polymerization reaction may be conducted under temperature rising or under isothermal condition.

As a hydrocarbon solvent used in the anion polymerization according to the invention, there are aliphatic hydrocarbons, alicyclic hydrocarbons and aromatic hydrocarbons. Among them, it is favorable to use one or two hydrocarbons selected from the group consisting of propane, n-butane, i-butane, n-pentane, i-pentane, cis-2-butene, trans-2-butene, i-butene, 1-butene, n-hexane, n-heptane, n-octane, i-octane, methylcyclopentane, cyclopentane, cyclohexane, 1-hexene, 2-hexene, 1-pentene, 2-pentene, benzene, toluene, xylene, ethylbenzene and so on.

The concentration of the monomer in the solvent is within a range of 5–50% by weight, preferably 10–35% by weight.

The ratio of the modified copolymer bonded at its terminal with the tin compound is not less than 30% by weight per total copolymer. When the ratio of the modified copolymer is less than 30% by weight, the heat build-up becomes high. Preferably, the ratio of the modified copolymer is not less than 50% by weight for obtaining low heat build-up.

In the tin compound represented by the general formula of $SnR_pX_q$, X is a halogen atom, preferably chlorine or bromine. Furthermore, when R is an alkyl group, the carbon number is preferably 1–20, while when R is an alkenyl group, the carbon number is preferably 2–20 because it is difficult to obtain tin compounds in which the carbon number of R exceeds 20. On the other hand, when R is a cycloalkyl group or an aryl group, the carbon number is preferably 6–20.

As the tin compound, mention may be made of tin tetrachloride, tin tetrabromide, butyltin trichloride, methyltin trichloride, octyltin trichloride, dimethyltin dibromide, dimethyltin dichloride, dibutyltin dichloride, diphenyltin dichloride, 1,2-bis(trichlorostannyl) ethane, 1,2-bis (methyldichlorostannyl) ethane, 1,4-bis(trichlorostannyl) butane, 1,4-bis(methyldichlorostannyl) butane, ethyltin trisstearate, butyltin trisoctanoate, butyltin trisstearate, butyltin trislaurate, dibutyltin bisoctanoate, dibutyltin bisstearate, dinutyltin bislaurate and the like. Among them, dimethyltin dichloride, dimethyltin dibromide, dibutyltin dichloride, diphenyltin dichloride, butyltin trichloride, methyltin trichloride, tin tetrachloride, tin tetrabromide and the like are preferable. Particularly, the bifunctional tin compounds are most preferable.

The amount of the tin compound used is within a range of 0.4–1.5 equivalent as a halogen atom per 1 equivalent of anion in the polymer. The coupling reaction between the tin compound and the active terminal of the copolymer is usually carried out at a temperature of 30–120° C. for 0.5–1 hour.

When tin-carbon bond in the copolymer is tin-butadienyl bond, the coupling reaction with the halogenated tin compound is carried out after a given amount of butadiene is added to anion of styrene-isoprene copolymer.

Carbon black used in the rubber composition according to the invention is not particularly critical in the kind and the amount. However, in order to attain the object of the invention for simultaneously establishing the low rolling resistance and the wet-skid resistance, the carbon black is preferable to have a concentration of >C=O functional group of not less than 0.040 meq/g as measured by oxime formation method and a concentration of —OH functional group of not less than 0.15 meq/g as measured by neutralization method with NaOH. When the concentration of >C=O functional group is less than 0.040 meq/g and the concentration of —OH functional group is less than 0.15 meq/g, it is difficult to simultaneously establish the low rolling resistance and the wet-skid resistance. The amount of carbon black used is preferable to be 20–150 parts by weight. When the amount is less than 20 parts by weight, the reinforcing effect is insufficient and the fracture resistance and wear resistance are poor, while when it exceeds 150 parts by weight, the kneading operation of rubber is considerably deteriorated and also it is difficult to obtain sufficient dispersion of carbon black.

As the carbon black used in the invention, mention may be made of (i) gas furnace black, (ii) channel black, (iii) carbon black obtained by subjecting the furnace black (inclusive of oil furnace black and gas furnace black) to an oxidation treatment with an oxidizing agent such as $HNO_3$, $H_2O_2$, $O_3$, dichromate or the like, (iv) carbon black obtained by subjecting gas furnace black or channel black to a heat treatment at a temperature of 100–900° C., (v) carbon black obtained by further subjecting the oxidized carbon black of the item (iii) to a heat treatment at a temperature of 100–900° C., (vi) carbon black obtained by treating gas furnace black or channel black through a low-temperature plasma process, and the like. Among them, carbon blacks of the items (iii) and (v) are preferable from a viewpoint of the reinforcing effect.

As the rubber ingredient other than the above defined styrene-isoprene copolymer, mention may be made of natural rubber and synthetic rubbers such as emulsion-polymerized styrene-butadiene copolymer, solution-polymerized styrene-butadiene copolymer, polybutadiene, polyisoprene, acrylonitrile-butadiene copolymer (NBR), butyl rubber, ethylene-propylene-diene terpolymer, halogenated butyl rubber and the like.

The rubber composition according to the invention is used by properly compounding with an antioxidant, zinc white, stearic acid, a vulcanization accelerator, a vulcanizing agent and the like in addition to the aforementioned carbon black.

The following examples are given in illustration of the invention and are not intended as limitations thereof.

(1) Preparation of polymers A–F (see Table 1)

[Polymer A]

Into a reaction vessel of 5 liters in capacity are charged 2250 g of cyclohexane, 440 g of isoprene, 55 g of styrene and 1.1 g of tetrahydrofuran under an atmosphere of nitrogen gas. After the adjustment to an initiation temperature of 300° C., 0.30 g of n-butyllithium is added and then the polymerization is carried out by raising temperature under adiabatic condition.

After the conversion reaches to 100%, 5 g of 1,3-butadiene is further added and subsequently 0.15 g of tin tetrachloride is added as a coupling agent to conduct coupling reaction for 30 minutes.

In this case, the coupling agent is added so that mol number of halogen atom is equal to that of lithium atom.

[Polymer B]

The same procedure as in the polymer A is repeated except that the mixing ratio of isoprene and styrene is changed.

[Polymer C]

The same procedure as in the polymer A is repeated except that 0.17 g of dibutyltin dichloride is used as the coupling agent.

[Polymer D]

The same procedure as in the polymer A is repeated except that 6 g of isoprene is added instead of the addition of 1,3-butadiene.

[Polymer E]

The same procedure as in the polymer A is repeated except that the mixing ratio of isoprene and styrene is changed.

[Polymer F]

The same procedure as in the polymer A is repeated except that 6 g of isoprene is added instead of the addition of 1,3-butadiene and 0.10 g of tetra-chlorosilane is used as the coupling agent.

(2) Evaluation of properties in polymers A–F (see Table 1)

The microstructure of the polymer is measured by means of proton NMR.

Further, the coupling efficiency (CE) indicates a ratio of polymer having tin-carbon bond to total polymer and is measured from an area ratio of high polymer component to low polymer component in a curve measured by a gel permeation chromatography (GPC: HLC-8020 made by Toso Company, column: GMH-XL (two columns in series) made by Toso Company).

TABLE 1

| Polymer | Coupling agent | Microstructure | | Tg (°C.) | Tin-carbon bond | CE (%) |
| --- | --- | --- | --- | --- | --- | --- |
| | | bound styrene content (%) | content of vinyl bond in isoprene portion | | | |
| A | Tin tetrachloride | 13 | 20 | −49 | butadienyl-tin bond | 68 |
| B | Tin tetrachloride | 22 | 19 | −38 | butadienyl-tin bond | 67 |
| C | Dibutyltin dichloride | 13 | 20 | −49 | butadienyl-tin bond | 69 |
| D | Tin tetrachloride | 13 | 20 | −49 | isoprenyl-tin bond | 67 |
| E | Tin tetrachloride | 28 | 40 | −24 | butadienyl-tin bond | 68 |
| F | Tetrachlorosilane | 13 | 20 | −49 | isoprenyl-silicon bond | 68 |

(3) Carbon black

There are used three kinds of carbon blacks a–c shown in Table 2.

Carbon black a is ASTM code N339. Carbon black b is obtained by subjecting ASTM code N330 to an oxidation at room temperature in an ozone atmosphere for 3 hours and then heating at 450° C. in a nitrogen gas atmosphere for 1 hour. Carbon black c is a channel black of special black 4A (trade name, made by Dixie) subjected to oxidation treatment.

TABLE 2

| | Concentration of —OH functional group (meq/g) | Concentration of >C = O functional group (meq/g) |
| --- | --- | --- |
| a | 0.138 | 0.033 |
| b | 0.172 | 0.044 |
| c | 0.327 | 0.131 |

(4) Evaluation of properties in carbon blacks a–c (see Table 2)

Measurement of concentration of >C=O functional group

1) Preparation of oximed carbon black

There are two Erlenmeyer flasks each containing about 1.5 g of carbon black therein. One of the flasks is added with a solution of 1 g of hydroxylamine hydrochloride in 20 ml of pyridine, while the remaining flask is added with 20 ml of pyridine. Each of these flasks is provided at its top with a ball-tipped condenser connecting to a calcium chloride tube and a deoxidation device. The whole of these devices are purged with a nitrogen gas.

Each of these flasks is put into an oil bath held at 100° C. and maintained at this temperature for 16 hours. After the completion of the reaction, 50 ml of 3 normal hydrochloric acid is added to the reaction product while cooling to neutralize an excessive amount of hydroxylamine. The reaction product is filtered under suction to obtain dispersion of oximed carbon black, which is washed with about 300 ml of distilled water. Then, the oximed carbon black is placed on a filter paper of No. 5B and further washed with 800 ml of the distilled water.

After the washing, the oximed carbon black is placed in a dryer held at 105° C. and dried up to a constant weight, whereby the oximed carbon black is prepared. (The same procedure as mentioned above is repeated in the flask for blank test).

2) Quantitative determination of nitrogen quantity (a) Preparation of a sample for quantitative determination About 0.2 g of each of the oximed carbon black and control carbon black is weighed and charged into a semi-micro Kjeldahl decomposition bottle, to which are added 2.5 g of calcium sulfate, 0.02 g of mercuric oxide and finally 4 ml of concentrated sulfuric acid.

The decomposition bottle is attached to a semi-micro Kjeldahl decomposition device and then gas is ignited while flowing tap water through an exhaust gas suction aspirator. The intensity of flame is first weakened to an extent that the content in the bottle is not boiled and then gradually strengthened to an extent that the content is boiled if the occurrence of white smoke becomes small in the bottle. After the content in the bottle becomes completely transparent, the ignition is further continued for 1 hour. After the ignition is stopped and the device is cooled to room temperature in air, the bottle is taken out from the device and added dropwise with about 10 ml of the distilled water. The content in the bottle is placed into a sample flask of a semi-micro Kjeldahl nitrogen distillation device and added with a small amount of water washing the bottle.

(b) Quantitative determination of nitrogen quantity

The sample flask is attached to a distillation device and a beaker containing 5 ml of 2% boric acid solution is connected to an output of a ball-tipped condenser in the distillation device. Thereafter, 25 ml of a mixed aqueous solution of sodium hydroxide (50% by weight) and sodium thiosulfate (5% by weight) is poured through an inlet for alkali in the distillation device and the inlet and steam port are closed to conduct distillation for 9 minutes.

The solution of 2% boric acid dissolving ammonia is titrated with 1/100 normal hydrochloric acid.

The same procedure is repeated by using a solution of ammonium sulfate having the known nitrogen quantity to prepare a calibration curve. Then, milliequivalent of nitrogen is determined from the titrated amount of the sample and the calibration curve to calculate milliequivalent (meq/g) of >C=O functional group per 1 g of carbon black. Measurement of concentration of —OH functional group

1) Preparation of acetylated carbon black

Into an Erlenmeyer flask containing about 2 g of carbon black are charged 20 ml of pyridine and 10 ml of acetic anhydride, and a calcium chloride tube is connected to an upper part of a ball-tipped condenser and a deoxidation device is connected thereto. The whole of these devices are purged with a nitrogen gas.

The flask is put into an oil bath held at 120° C. and maintained at this temperature for 15 hours. After the completion of the reaction, 100 ml of distilled water is added to the reaction product while cooling to decompose an excessive amount of acetic anhydride and then the acetylated carbon black is taken out through filtration under suction and washed with about 300 ml of the distilled water.

After the washing, the acetylated carbon black is placed in a dryer held at 105° C. and dried up to a constant weight, whereby the acetylated carbon black is prepared.

2) Quantitative determination of acetic acid

About 1 g of the acetylated carbon black is weighed and charged into a beaker and added with 20 ml of warm distilled water and 2 g of barium hydroxide. The beaker is placed in a water bath of 100° C. to conduct hydrolysis for 5 hours. The content is cooled in air and filtered under suction with a membrane filter. The beaker and the filter are washed with a small amount of the distilled water. The filtrate and washed water are combined and passed through an Umberlite IR120 (made by Organo Co., Ltd.) column of a cation exchange resin activated with hydrochloric acid to isolate acetic acid and then the column is washed until the acidity of acetic acid is not observed.

30 ml of the eluted solution is titrated with a solution of 1/500 normal sodium hydroxide using a mixed indicator of methyl red and bromocresol green.

Prior to the titration, a calibration curve is previously prepared by using a standard solution of 1/500 normal acetic acid. A quantity of acetic acid is measured from the above titrated value according to the calibration curve.

A milliequivalent (meq/g) of —OH functional group per 1 g of carbon black is calculated according to the following equation:

Concentration of —OH functional group =[quantity of acetic acid from calibration curve (ml)]/[weight of acetylated carbon black (g)]×f×2×1/100

(wherein f is a strength of a standard acetic acid solution).

(5) Compounding and kneading

Various ingredients are compounded and kneaded according to a compounding recipe shown in Table 3 through a laboplastomill of 250 ml in capacity and rolls of 3 inches in diameter.

TABLE 3

| Rubber ingredients | 100 parts by weight |
|---|---|
| polymer | (see Table 4) |
| natural rubber (NR) | (see Table 4) |
| Carbon black | (see Table 4) |
| Stearic acid | 2 |
| Antioxidant 6C *1 | 1 |
| Zinc white | 3 |
| Vulcanization accelerator DPG *2 | 0.5 |
| Vulcanization accelerator DM *3 | 0.6 |
| Sulfur | 1.5 |

*1: N-(1,3-dimethylbutyl)-N'-phenyl-p-phenylenediamine
*2: diphenyl guanidine
*3: dibenzothiazyl disulfide

(6) Vulcanization

The compounded rubber composition is vulcanized at 145° C. for 30 minutes.

(7) Evaluation of properties in vulcanized rubber (see Table 4)

Fracture resistance

It is measured according to JIS K-6301.

Low hysteresis loss

Tan δ is measured measured by using a dynamic spectrometer made by Rheometrix Corporation at 50° C. under dynamic shearing strain (amplitude: 1.0%, frequency: 15 Hz), and then a reciprocal of the measured value is represented by an index value on the basis that Comparative Example 4 is 100. The larger the index value, the smaller the hysteresis loss.

Wet-skid resistance

The same measurement as mentioned above is repeated except that the measuring temperature 0° C. The smaller the index value, the between the wet-skid resistance.

Wear resistance

It is evaluated by a Lambourn abrasion test, in which a worn amount is measured at room temperature and at a slipping ratio of 25% under a load of 4.5 kg. As a reciprocal of the measured value is represented by an index value on the basis that Comparative Example 4 is 100. The larger the index value, the better the wear resistance.

TABLE 4

| | Polymer | Compounding ratio (Polymer/NR) | C/B (parts) | tan δ (0° C.) | tan δ (50° C.) | Fracture resistance index | Lambourn abrasion index |
|---|---|---|---|---|---|---|---|
| Example 1 | A | 100/0 | a(45) | 101 | 114 | 102 | 101 |
| Example 2 | B | 100/0 | a(45) | 118 | 110 | 100 | 104 |
| Example 3 | C | 100/0 | a(45) | 100 | 117 | 114 | 106 |
| Example 4 | D | 100/0 | a(45) | 107 | 103 | 99 | 99 |
| Example 5 | A | 40/60 | a(45) | 98 | 112 | 103 | 110 |
| Example 6 | A | 100/0 | a(45) | 103 | 115 | 100 | 108 |
| Example 7 | A | 100/0 | b(45) | 102 | 135 | 101 | 102 |
| Example 8 | C | 100/0 | b(45) | 101 | 142 | 102 | 100 |
| Example 9 | A | 100/0 | c(45) | 104 | 173 | 99 | 98 |
| Example 10 | C | 100/0 | c(45) | 106 | 185 | 100 | 99 |
| Comparative Example 1 | E | 100/0 | a(45) | 202 | 85 | 94 | 92 |
| Comparative Example 2 | F | 100/0 | a(45) | 100 | 75 | 90 | 87 |
| Comparative Example 3 | A | °20/80 | a(45) | 74 | 90 | 105 | 117 |
| Comparative Example 4 | S-SBR | 100/0 | a(45) | 100 | 100 | 100 | 100 |

Moreover, Comparative Example 4 uses 100 parts by weight of tin-modified SBR (S-SBR) as a rubber ingredient.

As seen from the results of Table 4, when the high-Tg copolymers having given bound styrene content and vinyl bond are used as a styrene-isoprene copolymer (Examples 1–10), the wear resistance and fracture resistance are not lowered owing to the presence of styrene while maintaining the wet-skid resistance, and also the low hysteresis loss can considerably be improved by utilizing the low hysteresis loss of isoprene and including the tin-butadienyl bond.

Furthermore, the improvement of low hysteresis loss can be attained by compounding with carbon black having specified concentrations of >C=O and —OH functional groups (Examples 7–10).

On the other hand, when a Higher-Tg copolymer having a bound styrene content outside the range defined in the invention is used as a rubber ingredient, all properties are unfavorable (Comparative Examples 1, 4).

Further, when using the unmodified copolymer, strain dependency at 50° C. (pain effect) is large, so that the hysteresis loss becomes large and also the fracture resistance and wear resistance are poor (Comparative Example 2).

Moreover, when the compounding amount of the copolymer as a rubber ingredient is less than 30 parts by weight, the wet-skid resistance is considerably poor (Comparative Example 3).

As mentioned above, according to the invention, there can be provided rubber compositions for tire tread having low hysteresis loss without degrading the wet-skid resistance, fracture resistance and wear resistance.

What is claimed is:

1. A rubber composition for a tire tread containing as a rubber ingredient 30–100% by weight of an anion-polymerized styrene-isoprene copolymer consisting of a copolymer (a) having a bound styrene content of 5–25% and a content of 1,2- and 3,4-bonds in a bound isoprene portion of 5–35%, and terminal-modified copolymer (b);

wherein
the copolymer (a) comprises a copolymer consisting essentially of styrene and isoprene and is free of butadiene units;
30–100% by weight of the anion-polymerized styrene-isoprene copolymer is terminal-modified copolymer (b): and
the terminal-modified copolymer (b) comprises said copolymer (a) additionally with a butadiene unit present as a terminal group on said copolymer (a), and an active terminal which has been subjected to a coupling treatment with a halogenated tin compound represented by a formula $SnR_pX_q$ wherein R is a substituent selected from the group consisting of an alkyl group, an alkenyl group, a cycloalkyl group and an aryl group, X is a halogen atom, p is an integer of 0–3 and q is an integer of 1–4 provided that p+q=4.

2. A rubber composition according to claim 1, wherein the rubber composition contains carbon black having a concentration of >C=O functional group of not less than 0.040 meq/g as measured by oxime formation method and a concentration of —OH functional group of not less than 0.15 meq/g as measured by neutralization method with NaOH.

3. A rubber composition according to claim 1, wherein the content of the terminal-modified copolymer is not less than 50% by weight.

4. A rubber composition according to claim 1, wherein the halogenated tin compound is selected from the group consisting of tin tetrachloride, tin tetra-bromide, butyltin trichloride, methyltin trichloride, octyltin trichloride, dimethyltin dibromide, dimethyltin dichloride, dibutyltin dichloride, diphenyltin dichloride, 1,2-bis(trichlorostannyl) ethane, 1,2-bis(methyldichlorostannyl) ethane, 1,4-bis (trichlorostannyl) butane, 1,4-bis(methyldichlorostannyl)

butane, ethyltin trisstearate, butyltin trisoctanoate, butyltin trisstearate, butyltin trislaurate, dibutyltin bisoctanoate, dibutyltin bisstearate and dibutyltin bislaurate.

5. A rubber composition according to claim 1, wherein the rubber composition further contains a rubber ingredient selected from the group consisting of natural rubber, emulsion-polymerized styrene-butadiene copolymer, solution-polymerized styrene-butadiene copolymer, polybutadiene, polyisoprene, acrylonitrile-butadiene copolymer, butyl rubber, ethylene-propylene-diene terpolymer and halogenated butyl rubber in addition to the styrene-isoprene copolymer.

* * * * *